United States Patent
Cooke et al.

(10) Patent No.: US 12,301,016 B2
(45) Date of Patent: May 13, 2025

(54) CORELESS POWER TRANSFORMER DESIGN

(71) Applicant: Massachusetts Institute of Technology, Cambridge, MA (US)

(72) Inventors: Chathan M. Cooke, Cambridge, MA (US); Daniel Schemmel, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 18/021,911

(22) PCT Filed: Aug. 17, 2021

(86) PCT No.: PCT/US2021/046202
§ 371 (c)(1),
(2) Date: Feb. 17, 2023

(87) PCT Pub. No.: WO2022/055669
PCT Pub. Date: Mar. 17, 2022

(65) Prior Publication Data
US 2023/0378811 A1    Nov. 23, 2023

Related U.S. Application Data (60) Provisional application No. 63/076,009, filed on Sep. 9, 2020.

(51) Int. Cl.
*H02J 50/12*    (2016.01)
*H01F 38/14*    (2006.01)

(52) U.S. Cl.
CPC .............. *H02J 50/12* (2016.02); *H01F 38/14* (2013.01)

(58) Field of Classification Search
CPC .. H02J 50/12; H02J 50/70; H02J 50/50; H02J 50/10; H02J 50/20; H02J 7/2434;
(Continued)

(56) References Cited

U.S. PATENT DOCUMENTS 10,326,315 B2    6/2019    Bae et al.
2014/0139041 A1    5/2014    Bohori et al.
(Continued)

FOREIGN PATENT DOCUMENTS

WO    2019148070 A2    8/2019

OTHER PUBLICATIONS

International Preliminary Report on Patentability issued on Mar. 7, 2023 in related PCT Application No. PCT/US2021/046202.
(Continued)

*Primary Examiner* — Lincoln D Donovan
*Assistant Examiner* — Alex W Lam
(74) *Attorney, Agent, or Firm* — Gesmer Updegrove LLP (57) ABSTRACT

A primary resonant coil (22) and a secondary resonant coil (23) are different in the proposed improved coreless power transformer design, wherein the differences between the two resonant coils are achieved in two ways: (1) in the first difference, the two resonant coil windings are made to be different; for example, to have different number of turns, turn spacing and/or different wire sizes, and (2) the second difference is with the capacitance values of the two parallel capacitors each used to resonate their respective coils.

27 Claims, 8 Drawing Sheets

(58) Field of Classification Search
CPC .. H02J 50/60; H02J 50/90; H02J 50/40; H02J 50/402; H01F 38/14; H01F 27/24; H01F 27/36; H01F 27/28; H01F 2007/1888
See application file for complete search history.

(56) References Cited

U.S. PATENT DOCUMENTS

| | | |
|---|---|---|
| 2014/0273835 A1 | 9/2014 | Ghovanloo et al. |
| 2015/0380988 A1 | 12/2015 | Chappell et al. |
| 2016/0072306 A1* | 3/2016 | Tsuda .................. H02J 50/402 307/104 |
| 2018/0167110 A1* | 6/2018 | Peralta .................... H01Q 7/00 |
| 2019/0267843 A1* | 8/2019 | Cooke .................... H02J 50/12 |

OTHER PUBLICATIONS

International Search Report and Written Opinion issued on Nov. 9, 2021 in related PCT Application No. PCT/US2021/046202.
Extended European Search Report dated Nov. 27, 2024 issued in related EP Application No. 218673408.
Office Action issued by the Chilean Patent Office on Oct. 14, 2024 in related Chilean Patent Application No. 202300638.
Chilean Search Report issued in related CL Application No. 202300638 on Oct. 14, 2024.

* cited by examiner

FIG. 3 Example Low---Loss Coreless Transformer Coil Configurations with Asymmetric Resonant Coils FIG. 4  1 kW, 150 kHz Coreless Transformer Windings FIG. 5 Coil Configuration Section Drawings for 1kW Coreless Transformers FIG. 6  Example Constructed Asymmetric Coreless Transformers FIG. 7 Asymmetric Coreless Transformer Calculated and Measure Performance
(a) 150 kHz Design
(b) 300 kHz Design Figure FIG. 8  Full 1 kW power test setup with 300 kHz low-loss coreless power transformer

CORELESS POWER TRANSFORMER DESIGN

RELATED APPLICATIONS

This application claims the benefit of provisional application Ser. No. 63/076,009 filed Sep. 9, 2020, which is incorporated herein by reference in its entirety.

BACKGROUND OF THE INVENTION

Field of Invention

The present invention relates generally to the field of power transformers. More specifically, the present invention is related to improvements in coreless power transformers.

Discussion of Prior Art

Increased efficiency of coreless power transformers can be achieved by allowing the multiple resonant circuits in the transformer to have non-equal component values.

The basic coreless transformer revealed in the thesis by Angel J. Carvajal (dated Feb. 2, 2018) titled "First Principles Design of Coreless Power Transformers" showed a 4-coil coreless transformer design where all 4 coils are magnetically coupled and where two of these 4 transformer coils form separate LC resonant circuits and these two LC circuits were designed to be equal with equal inductors and equal capacitors and thus the two individual resonant circuits had equal natural resonant frequencies.

In this invention the coreless power transformer exhibits higher power transfer efficiencies when the two coupled LC resonant circuits employed in the transformer are not identical in their inductance and capacitance values, and furthermore the natural frequencies of the two resonant circuits also do not need to be equal.

The implementation of non-equal resonant inductors thus enable added degrees of freedom in the coreless transformer design not included in the Angel Thesis of 2018 due to the added variation of the inductance, capacitance of their respective LC circuits and different magnetic couplings between the 4 coils due to the added variation in the physical structure of the coils compared to when the two resonant coils were constrained to be equal.

In the report titled "Overview and Status: MIT-ProlecGE Collaboration", specific coreless transformer design examples with non-equal resonant circuit capacitance and inductance values were described. Transfer efficiency factor S21 values exhibited higher values of greater than 0.98 whereas prior equal resonant circuit designs exhibited typical maximum S21 values of about 0.967 as outlined in the pre-grant patent publication US 2019/0267843 A1.

The above-noted report was prepared after the calculation of a number of different unequal resonant circuit designs. Calculated designs include a number of coreless transformer designs that achieve S21 values in excess of 0.98. Investigations were also conducted on coreless transformer designs with un-equal resonant circuits that exhibit S21 values in excess of 0.98.

Two specific unequal coupled resonant circuit coreless power transformer designs, one for operation frequency near 150 kHz and the other for operation frequency near 300 kHz, were also investigated. Measured performance for these two coreless power transformers were also investigated. These unequal coupled resonant circuit coreless power transformers exhibited higher transfer efficiency factors than was obtained with the equal resonant circuit designs reported in the pre-grant patent publication US 2019/0267843 A1.

In many cases designs with good efficiency often have capacitance ratios of 1.2 to 1.6 for the capacitances in the two unequal resonant circuits. The natural resonant frequencies for the two resonant circuits often exhibit ratios of 0.95 to 1.05, where all these values are illustrative and can range beyond these values.

Whatever the precise merits, features, and advantages of the prior art is, none of them achieves or fulfills the purposes of the present invention.

SUMMARY OF THE INVENTION

In one embodiment, the present invention provides a transformer system comprising: four magnetically coupled coils that have fixed spacing geometry comprising: a drive coil (21) that produces magnetic fields; a load coil (24); a first resonant coil (22); a second resonant coil (23); the following six magnetic couplings exist between the four magnetically coupled coils: a first magnetic coupling between the drive coil (21) and the first resonant coil (22), a second magnetic coupling between the first resonant coil (22) and the second resonant coil (23), a third magnetic coupling between the second resonant coil (23) and the load coil (24), a fourth magnetic coupling between the drive coil (21) and the to second resonant coil (23), a fifth magnetic coupling between the first resonant coil (22) and the load coil (24), and a sixth magnetic coupling between the drive coil (21) and the load coil (24), the drive coil (21) producing magnetic fields and the first resonant coil (22) being magnetically coupled to the drive coil (21) producing energy that is stored by the first resonant coil (22) and the second resonant coil (23) being magnetically coupled to the first resonant coil (22) to propagate the energy stored in the first resonant coil (22) to the second resonant coil (23) without using a magnetic core, wherein the second resonant coil (23) is then magnetically coupled to the load coil (24) where the energy is transferred to the load coil (24), and wherein the first resonant coil (22) and the second resonant coil (23) are different in at least one of, or a combination of, the following: (a) the first resonant coil (22) and the second resonant coil (23) have different number of turns, (b) the first resonant coil (22) and the second resonant coil (23) have different turn spacing, and (c) the first resonant coil (22) and the second resonant coil (23) have different wire sizes.

In another embodiment, the present invention provides a transformer system comprising: four magnetically coupled coils have fixed spacing geometry comprising: a drive coil (21) that produces magnetic fields; a load coil (24); a first resonant coil (22); a second resonant coil (23); the following six magnetic couplings exist between the four magnetically coupled coils: a first magnetic coupling between the drive coil (21) and the first resonant coil (22), a second magnetic coupling between the first resonant coil (22) and the second resonant coil (23), a third magnetic coupling between the second resonant coil (23) and the load coil (24), a fourth magnetic coupling between the drive coil (21) and the second resonant coil (23), a fifth magnetic coupling between the first resonant coil (22) and the load coil (24), and a sixth magnetic coupling between the drive coil (21) and the load coil (24), the drive coil (21) producing magnetic fields and the first resonant coil (22) being magnetically coupled to the drive coil (21) producing energy that is stored by the first resonant coil (22) and the second resonant coil (23) being magnetically coupled to the first resonant coil (22) to propagate the energy stored in the first resonant coil (22) to the second resonant coil (23) without using a magnetic core, wherein the second resonant coil (23) is then magnetically coupled to the load coil (24) where the energy is transferred to the load coil (24), and wherein capacitance values of two parallel capacitors used to resonate the first resonant coil (22) and the second resonant coil (23) are different.

In yet another embodiment, the present invention provides a method of implementing energy transfer with four magnetically coupled coils comprising: producing magnetic fields using a drive coil (21); providing a magnetically coupled load coil (24); magnetically coupling the drive coil (21) and a first resonant coil (22); magnetically coupling the first resonant coil (22) and a second resonant coil (23); magnetically coupling the second resonant coil (23) and the load coil (24); magnetically coupling the drive coil (21) and the second resonant coil (23); magnetically coupling the first resonant coil (22) and the load coil (24); magnetically coupling the drive coil (21) and the load coil (24), and picking the first resonant coil (22) and the second resonant coil (23) to be different in at least one of, or a combination of, the following manner: (a) the first resonant coil (22) and the second resonant coil (23) have different number of turns, (b) the first resonant coil (22) and the second resonant coil (23) have different turn spacing, and (c) the first resonant coil (22) and the second resonant coil (23) have different wire sizes, or (d) capacitance values of two parallel capacitors used to resonate either the first resonant coil (22) or the second resonant coil (23) are different.

DESCRIPTION OF THE PREFERRED EMBODIMENTS

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

The design of coreless power transformers with good transfer efficiency was demonstrated in the thesis by Angel J. Carvajal (dated Feb. 2, 2018) titled "First Principles Design of Coreless Power Transformers". The work in that thesis provided a physics-based foundation for detailed calculations concerning the windings of a multi-coil-winding coreless transformer. This physics-based calculation enabled the determination of the performance of a transformer constructed from the physical components and their arrangement. The thesis also provided experimental confirmation of both the individual steps within the calculation, as well as the actual performance of a full transformer. In this thesis, the 4-coil coreless transformer arrangement was revealed, where 2 of these 4 coils were resonantly coupled and provided enhanced magnetic linkage between a separate input drive coil and a separate output load coil.

To quantify the performance of a high frequency transformer, the S-Parameter transfer coefficient S21 provides a good measure of the efficiency of the transformer. If operated under matched real impedance conditions, the efficiency can be determined from the square of the S21 value times 100 to get percent values. For example, in the Carvajal thesis, there was a calculated S21 value of 0.967 and a measured value of 0.96. Hence, the matched condition efficiency of the coreless transformer design example in the Carvajal thesis corresponds to 93.5% calculated and 92% measured. Note, higher power efficiency corresponds to lower losses, for this case the corresponding power losses were 6.5% and 8%, respectively. Lower loss performance is a very valuable characteristic in power transformers since losses represent wasted energy lost into heat and lost revenue.

The proposed improved design of coreless power transformers can increase these power efficiency values to 96% and more, and hence reduce losses accordingly to 4% or less. This improved performance was developed by the addition of an improvement to the physics-based analytic calculations presented in the previously described Carvajal thesis and included new variables for differences in the two resonant coils. A means to provide automated repeated cycling of such calculations is added where the controlling parameters are varied at each cycle so as to keep variations that yield improved S21 performance results. These calculations are repeated with any improvement saved, so that after many cycles an improved design is developed. The result of this added improvement to the physics-based calculations was an ability to analytically search through many (even many thousand) design variations and establish those that exhibited better performance.

The result of the application of this improved analytic capability was to determine that certain transformer design properties yield better power transfer efficiencies, and hence exhibit lower losses. The specific property of the coreless power transformer discussed here concerns the two resonant coils. In the Carvajal thesis work, the design for the two resonant coils was made equal and had equal value parallel capacitors on each coil. Thus, the resonant frequency and all the parameters of each of these two resonant coils was set to be equal. In the improved coreless transformer design presented here, and in contrast to the two equal resonant coils, intentionally different resonant coils are employed.

Figure 1:
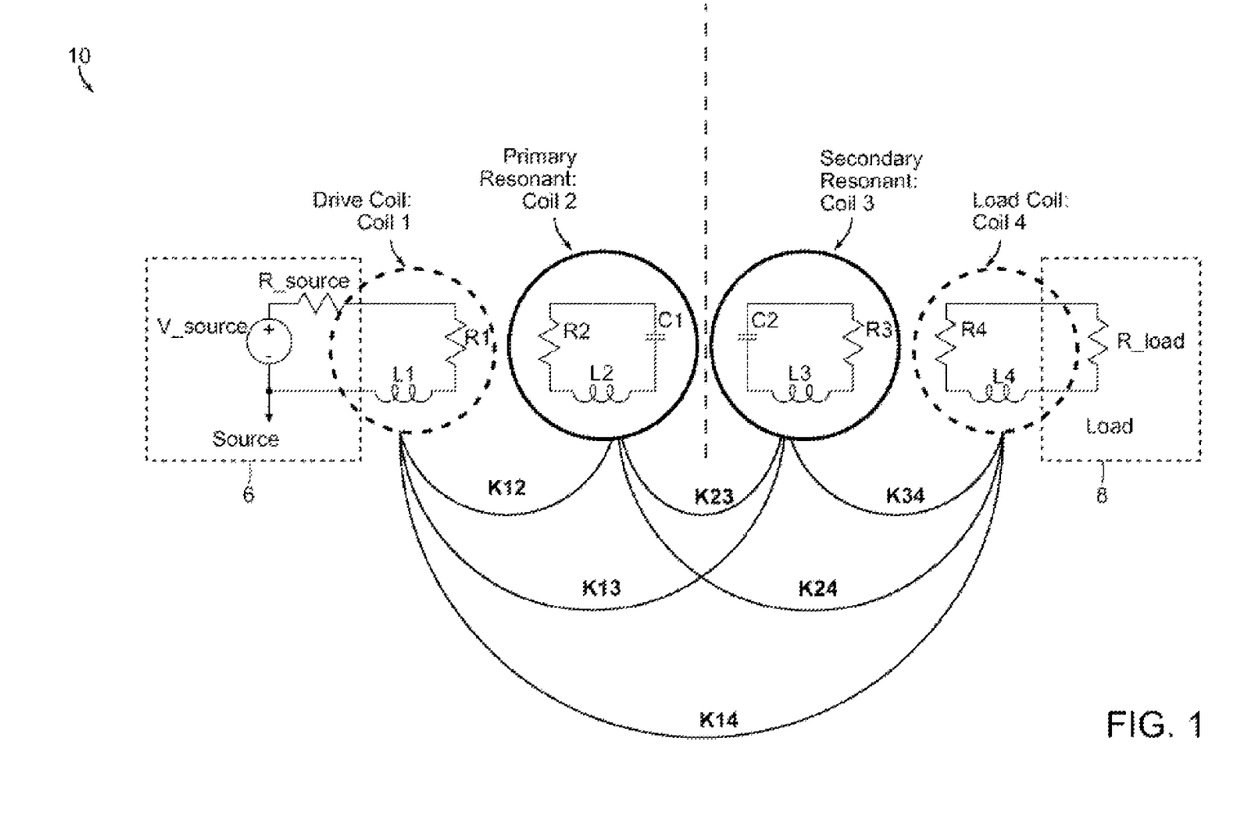
FIG. 1 is a schematic diagram illustrating lump circuit representation of the inventive 4-coil coreless transformer.

The 4-coil system 10 includes a source voltage (V_source) with source impedance (R-source) denoted by a source element 6, two resonant coils denoted as primary resonant coil 2 and secondary resonant coil 3, a drive coil 1, and a load coil 4 is connected to the output load impedance (R_load) defined by a load 8, as shown in FIG. 1. Each coil 1-4 is represented by its lumped series inductance L1, L2, L3, L4 and resistance circuit equivalent R1, R2, R3, R4, respectively. The resonant coils 2, 3 include their coil and a parallel-connected lumped capacitor C1, C2. When a high frequency signal powers the drive coil 1, the resulting magnetic field excites the primary resonant coil 2, which stores energy in the same manner as an LC tank. The magnetic field of drive coil 1 also influences the secondary resonant coil 3 and the load coil 4 (though not to the same degree). A critical interaction occurs between the two resonant coils which, act as near ideal low loss resonators and work to propagate the energy between them. The four coils are all inductively coupled to one another so as to collectively provide efficient transfer of energy from the drive to the load coils. With the two resonant coils being different this enables a greater range of variation in the 3 respective coupling coefficients that involve each of the resonant coils and thereby enable improved combinations of magnetic coupling coefficients for transferring energy from the drive to the load coil where power will be transferred over to the loading device.

For a set of N coils in close proximity to each other, there will be (N−1) factorial coupling coefficients that describe the overall magnetic linkages between all the coils. Therefore, because there are 4 coils in this system, there are six coupling coefficients that are determined by the geometry of each coil and their relative position to one another: K12, K13, K14, K23, K24, and K34. Each Kxy refers to the coupling coefficient between Coil-X and Coil-Y. FIG. 1 depicts this lumped equivalent circuit and the corresponding magnetic coupling coefficients. There are a plethora of design options in physically placing the four coils in these systems.

The four coils can be positioned in space in a multitude of ways. The resonant coils can be placed outside of the drive and load coils or nested within their respective drive/load coil, or all coils can even be nested inside of each other.

As stated earlier, all coils are coupled in the 4-coil system and the goal is to transfer power efficiently from the drive coil to the load coil.

Figure 2:
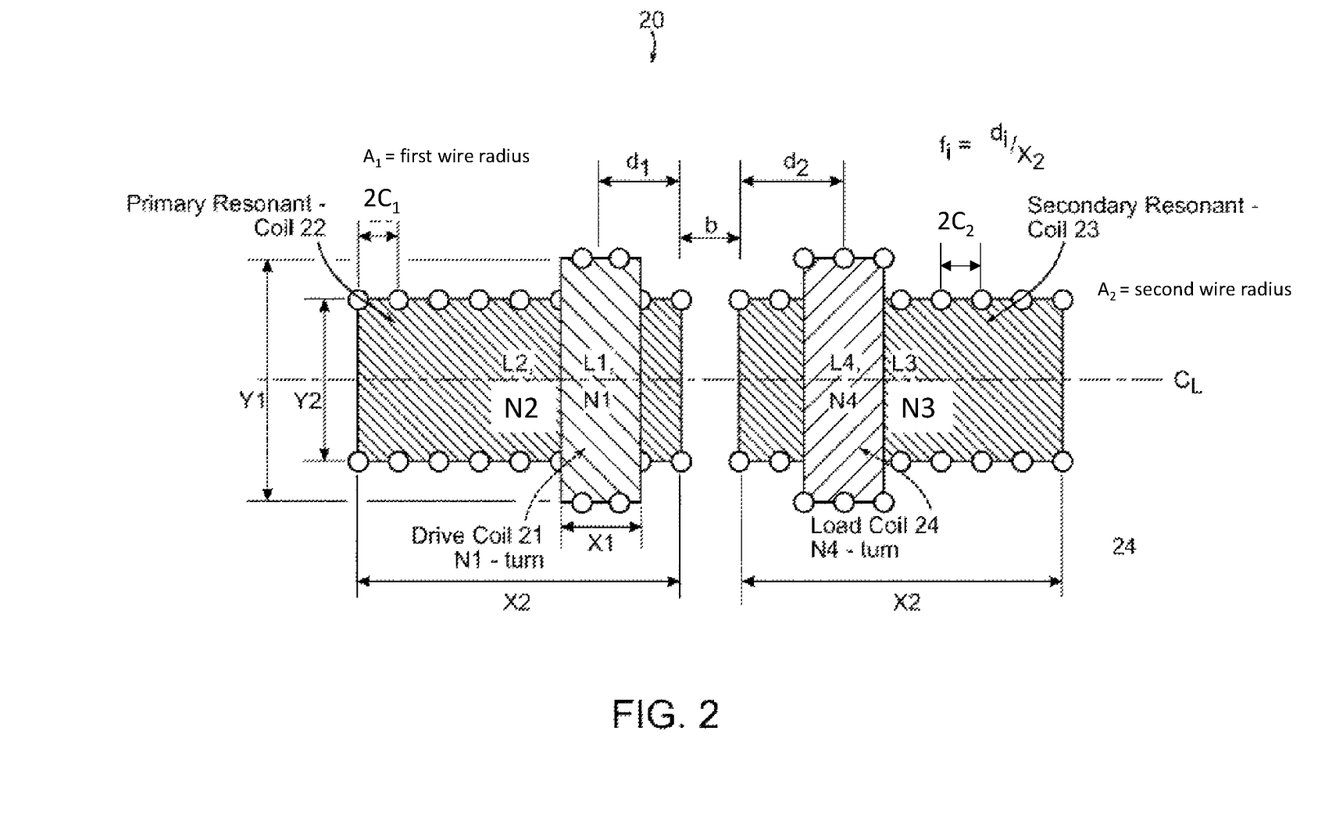
FIG. 2 is a schematic diagram illustrating the inventive 4-coil coreless transformer system with nested coils.

FIG. 2 shows a schematic diagram illustrating an example of the 4-coil system 20 used in accordance with the invention. While all coils are magnetically coupled it is desirable to have the drive coil 21 more highly coupled to the primary resonant coil 22, so the primary resonant coil 22 can receive energy from the drive coil 21 (by having a higher K coefficient value associated with their coupling). The same goes for coil 24 and coil 23. The load coil 24 is more highly coupled to the second resonant coil to assist in the extraction of energy from the secondary resonant coil 23. To enhance these couplings, the coils 21 and 22 should be in close proximity or nested within each other and so should coils 23 and 24 be in close proximity or nested within each other.

For the 4-coil system in FIG. 2 the drive coil 21 has a diameter of Y1 and a length of X1 while the primary resonant coil 22 has a diameter Y2 and length X2. The drive coil 21 includes N1 turns of a wire element, and load coil has N4 turns of another wire element. Primary resonant coil 22 has N2 turns and secondary resonant coil 23 has N3 turns of their wire elements. It should be noted that all 4 coils can have different wire elements. The secondary resonant coil 23 has length X3. Also, the distance between the primary resonant coil 22 and secondary resonant coil 23 is the distance b. The wire radius of the wire associated with the primary resonant coil 22 is $A_1$ and the center-to-center distance of the primary resonant coil 22 is $2C_1$. The wire radius of the wire associated with the secondary resonant coil 23 is $A_2$ and the center-to-center distance of the primary resonant coil 23 is $2C_2$.

As noted earlier, the primary resonant coil 22 and the secondary resonant coil 23, are different in the present invention as compared to what was disclosed in the Carvajal thesis (which required similar resonant coils). Differences between the two resonant coils are achieved in two ways: (1) in the first difference the two resonant coil windings are made to be different, for example, to have different number of turns, turn spacing and/or different wire sizes, and (2) the second difference is with the capacitance values of the two parallel capacitors each used to resonate their respective coils. The amount of difference in resonant coil and capacitance values can vary but typical examples range with turns number differences less the 2-fold, turn spacing less than 2-fold and wire size less than 2-fold and parallel capacitor differences less than 3-fold.

As an example, a 1 kW coreless transformer, with an output-over-input voltage ratio of 4, and with S21 values of 0.98 or greater (low-loss-designs) can be achieved with the 1st and 2nd resonant coils possessing coil-turns-ratios that can range over a modest amount of difference. Example 1 kW designs exhibited number-of-turns-ratios, (1st-coil-turns, $N_2$/2nd-coil-turns, $N_3$): ($N_2/N_3$) of (8/11), (9/11), (8/12), (7/8), (7/9), (6/9), (6/8). Hence in these examples the 1st-coil had 6 to 9 turns, while the 2nd-coil had 8 to 12 turns. Notice in these example designs, the difference in the two resonant coils was achieved when the number of turns in the 2nd-coil was greater than the number of turns in the 1st-coil. Additionally, the coils can differ according to the spacing between adjacent turns in the coil and this spacing difference can change by 10% and more.

The ratio of resonant parallel capacitance values in these example 1 kW high efficiency low-loss designs defined as (1st-coil-capacitance, C/2nd-coil-capacitance, $C_2$)=($C_1/C_2$) ranged over 1.62, 1.52, 2.20, 1.83, 1.60, 2.39, 2.54, 2.22, 2.05, 1.32, 1.67, 1.34, 2.10, 1.93, 2.03, 1.32, 1,50, 1.51, 1.17, 1.59, 1.28, 1.88, 1.29, 1.30. Hence, in these example designs, this parallel capacitance value ratio ($C_1/C_2$) varied from near one to about 2.5.

The resonant coil inductance values, L, are established according to the number of turns, spacing between turns, the wire diameter and the radius of the coil. In the above 1 kW design examples these inductance values varied, and the resultant difference in the inductance values for the 1st ($L_2$) and for the 2nd ($L_3$) resonant coils can be expressed as a ratio of inductances (1st-coil-inductance, $L_2$/2nd-coil-inductance, $L_3$). This inductance ratio ($L_2/L_3$) was typically less than one so the 2nd-coil inductance was greater of the 1st-coil inductance, however in other designs this ratio can be greater than one.

The resonant frequency, $f_r$, of an isolated low-loss LC (inductor-capacitor) tank circuit is related to the product of the corresponding L and C values.

$$f_r = \frac{1}{2\pi\sqrt{LC}} [\text{Hz}]$$

For these low-loss example designs the different L and C values of the two resonant coils caused different resonant frequencies, $f_r$. The amount of frequency difference between the two resonant coils in one transformer can be expressed as a ratio of the two frequencies (1st-coil-frequency/2nd-coil-frequency), and for the example low-loss designs, the frequency ratio typically was in the range from 0.8 to 1.2. Example low-loss designs exhibited resonant capacitance ratios ($C_1/C_2$) of about 1.3 and resonant inductance ratios ($L_2/L_3$) of about 0.77, but could also have ratio values larger and smaller than these.

The technical basis for enhanced low-loss performance when the two resonant coils in the coreless transformer are different appears to be associated with the inherent asymmetry of the windings in the transformer caused by the need for a non-unity transformer voltage-ratio, a ratio that increases or decreases the output voltage relative to the input voltage. Typical output/input voltage ratios for a step-up transformer may be as small as 2, or as great as 20, or more. A step-down transformer would have the opposite winding ratios. In any case, to achieve a substantially greater output voltage compared to the input voltage involves windings with more turns on the output/load winding of the transformer compared to the input/drive winding of the transformer.

The overall preferred coreless transformer structure thus includes a drive coil magnetically coupled to three other coils including a 1st-resonant-coil, which is also magnetically coupled to three other coils including a second resonant coil, where this second resonant coil is magnetically and resonantly different from that of the 1st-resonant-coil, and an output coil that is magnetically coupled to three other coils including the 2nd-resonant-coil. The output coil is connected to the load device. The input coil is driven at the design frequency, typically by switched output power electronics, such as an H-Bridge drive circuit or a sinusoidal power source. A desired greater output voltage compared to the input voltage causes asymmetric coil characteristics where the output coil has more turns than the input coil and the 2nd resonant coil has more turns than the 1st resonant coil.

Figure 3:
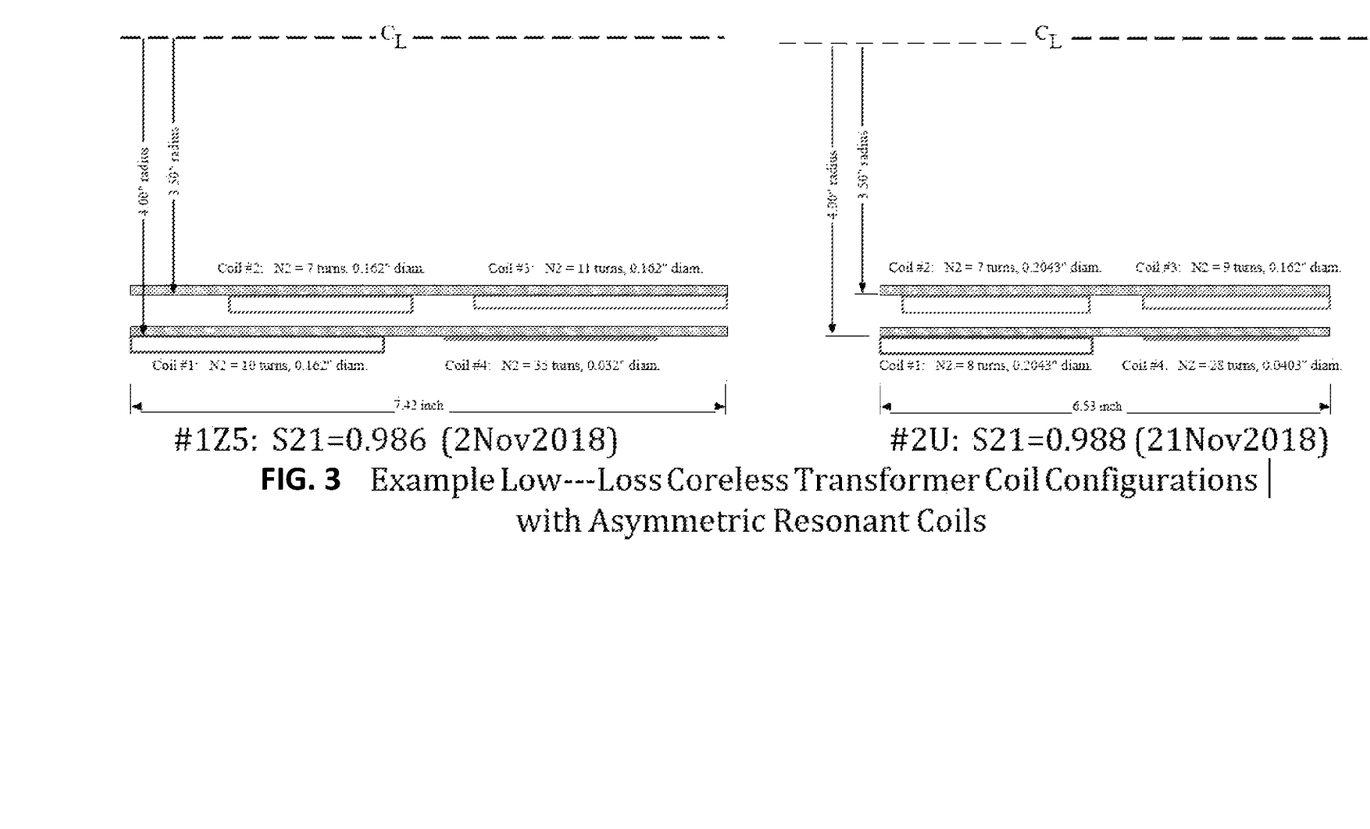
FIG. 3 depicts two example low-loss coreless transformer coil configurations with asymmetric resonant coils.

Two example low-loss coreless transformer arrangements are depicted in FIG. 3. Both employ 8-inch OD coil formers and are designed for 1 kW power with a 4:1 voltage ratio. Both employ 2nd resonant coils with more turns than the 1st resonant coil.

It is also noted that, as revealed in the Carvajal thesis, there are 6 magnetic coupling coefficients that link the four coils in the coreless transformer and that these 6 magnetic coupling coefficients continue to be part of the coreless design for transformers with the asymmetric resonant coils. Typical values for the magnetic coupling coefficients are often near to: $K12=0.7$, $K13=0.3$, $K14=0.3$, $K23=0.3$, $K24=0.3$ and $K34=0.7$, but can range substantially different from these.

Further work on asymmetric coreless transformer designs resulted in the specific designs for 2 examples for 1 kW power, one of these two was designed for operation at about 150 kHz operating frequency, and the second of these two was design for operation at about 300 kHz operating frequency. They demonstrated the asymmetric resonant coil design approach was valid independent of operating frequency, both implement resonant coils that had different numbers of turns; 9 and 12 turns for the 150 kHz design, and 7 and 10 turns for the 300 kHz design. These two 1 kW power coreless transformer designs were constructed and experimentally tested. The test results confirmed the improved low-loss performance achieved with the asymmetric resonant coils.

Figure 4:
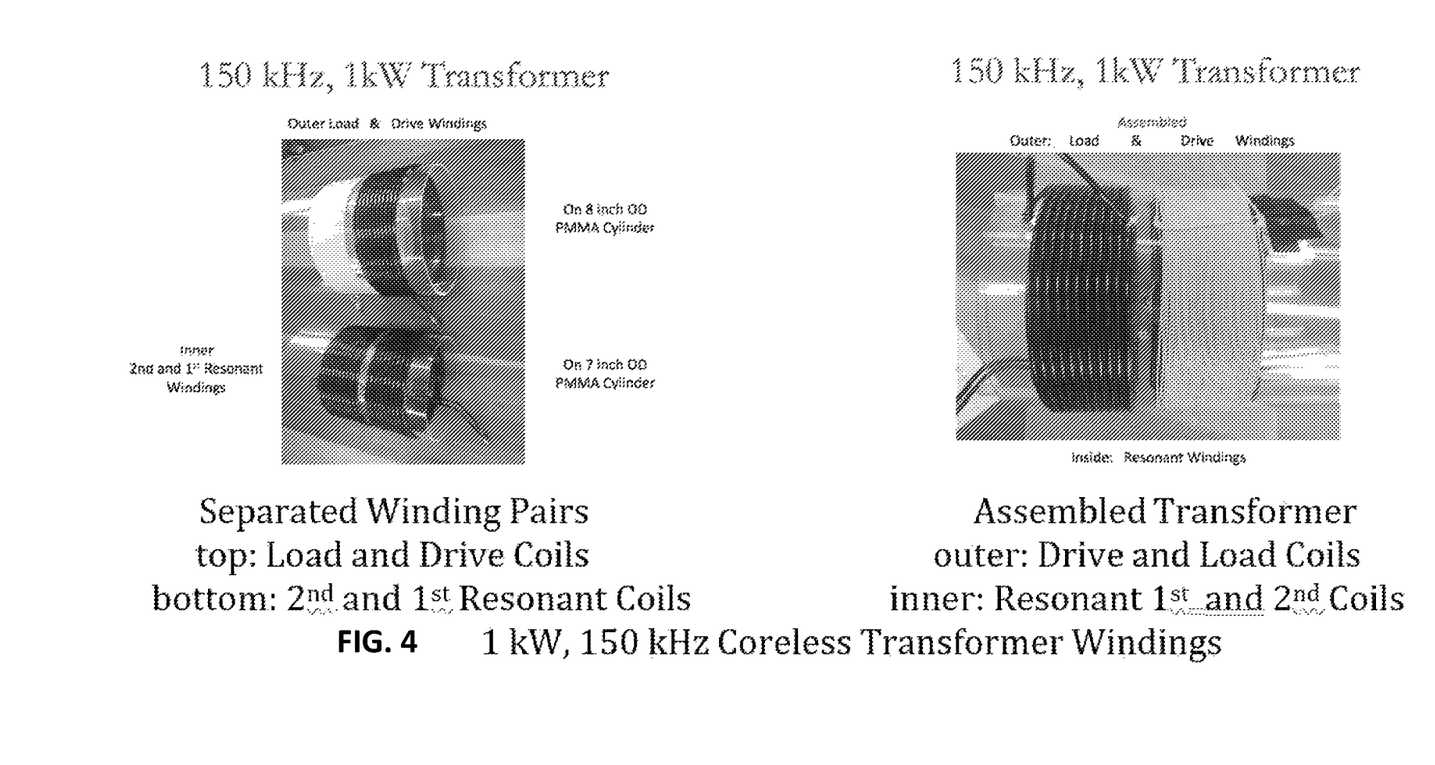
FIG. 4 shows pictures of the physical arrangement of the four coils for the 150 kHz design.
Figure 5:
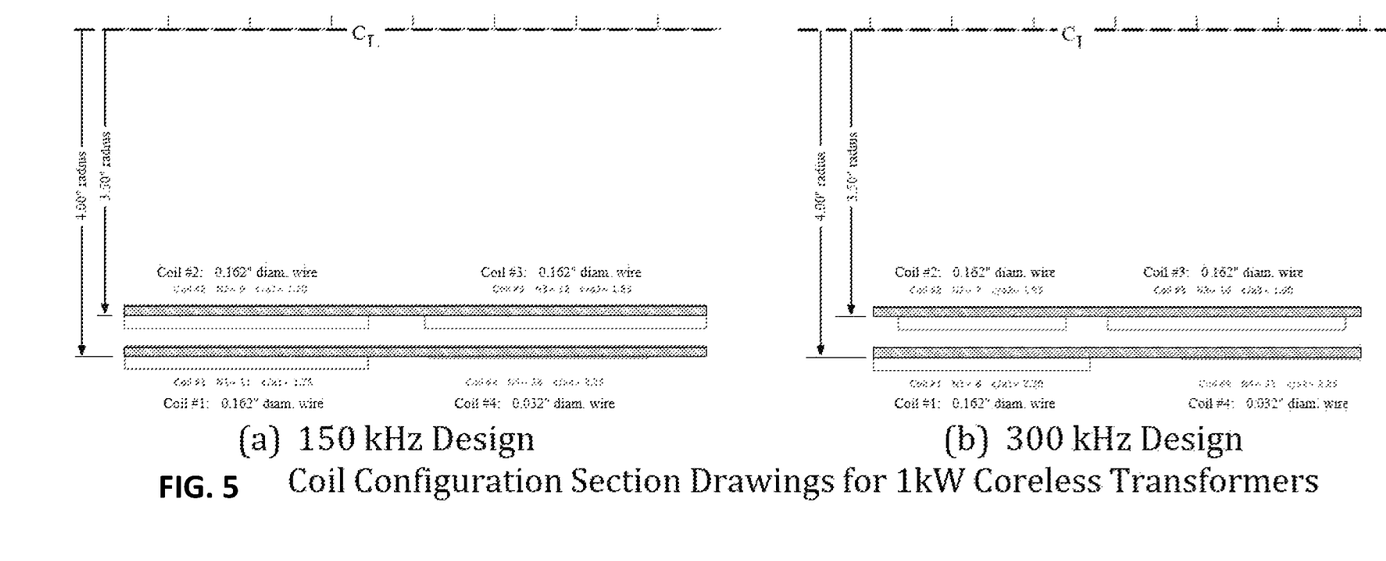
FIG. 5 depicts the winding arrangement as side section views for the 150 kHz and 300 kHz transformer designs.

FIG. 4 shows pictures of the physical arrangement of the 4 coils for the 150 kHz design, and FIG. 5 depicts the winding arrangement as side section views for the 150 kHz and 300 kHz transformer designs.

Figure 6:
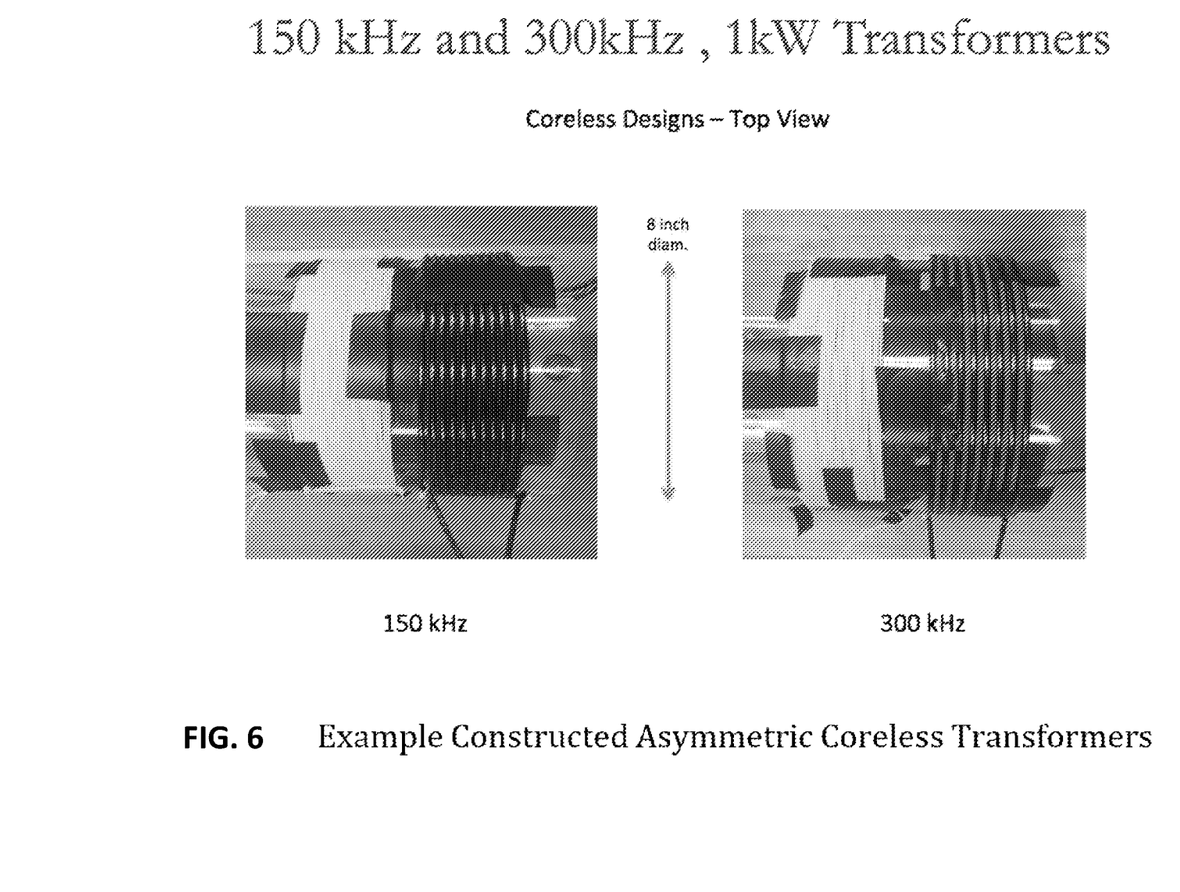
FIG. 6 depicts images of the constructed 150 kHz and 300 kHz coreless power transformers with asymmetric resonant coils.

FIG. 6 shows images of the constructed 150 kHz and 300 kHz coreless power transformers with asymmetric resonant coils.

Figure 7:
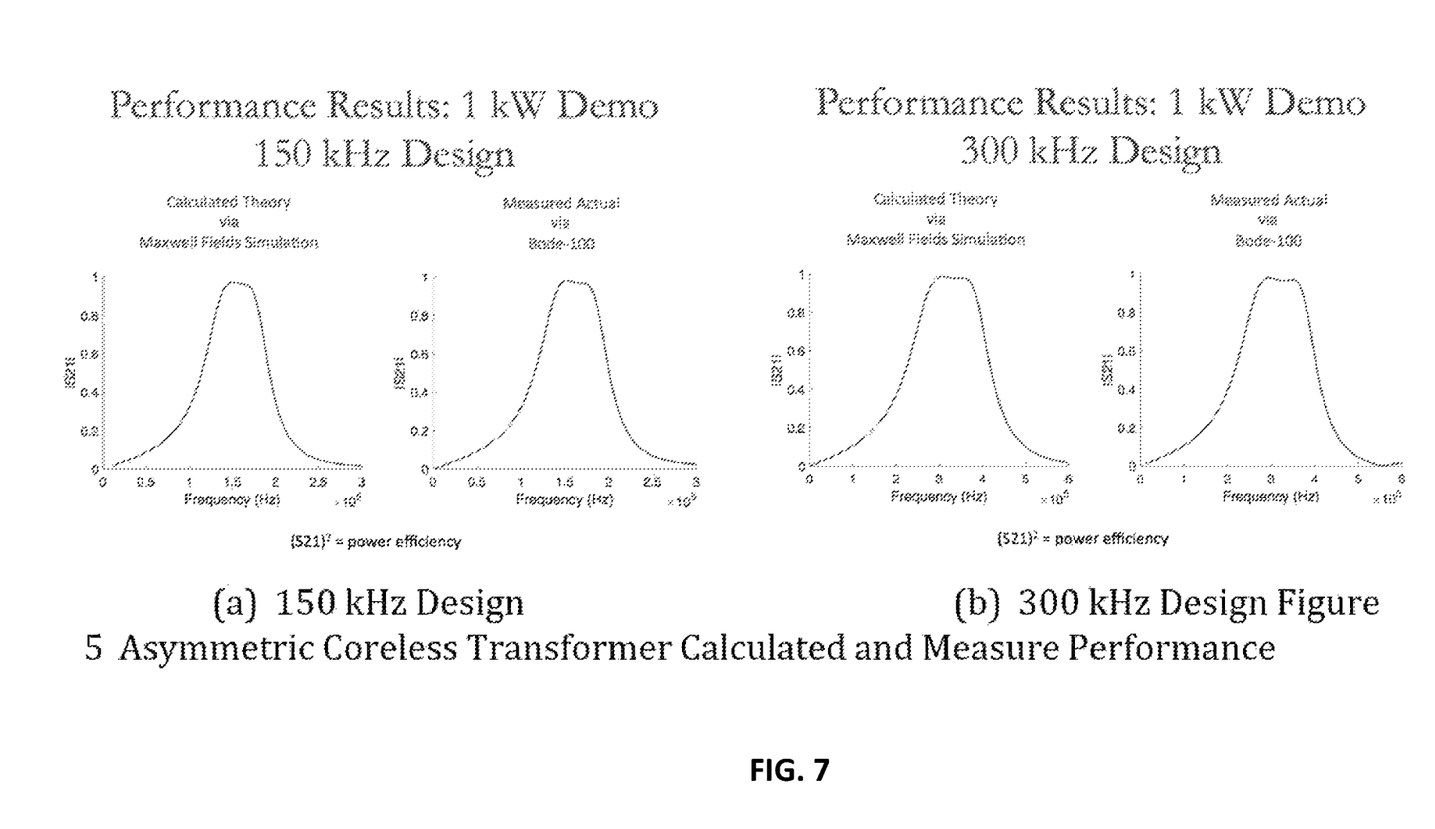
FIG. 7 depicts asymmetric coreless transformer calculated and measure performance.

Calculated and measured values for the S21 parameter coefficient are given in FIG. 7 for both the 150 kHz design and the 300 kHz design. There is excellent agreement between calculation and measured experimental values.

Figure 8:
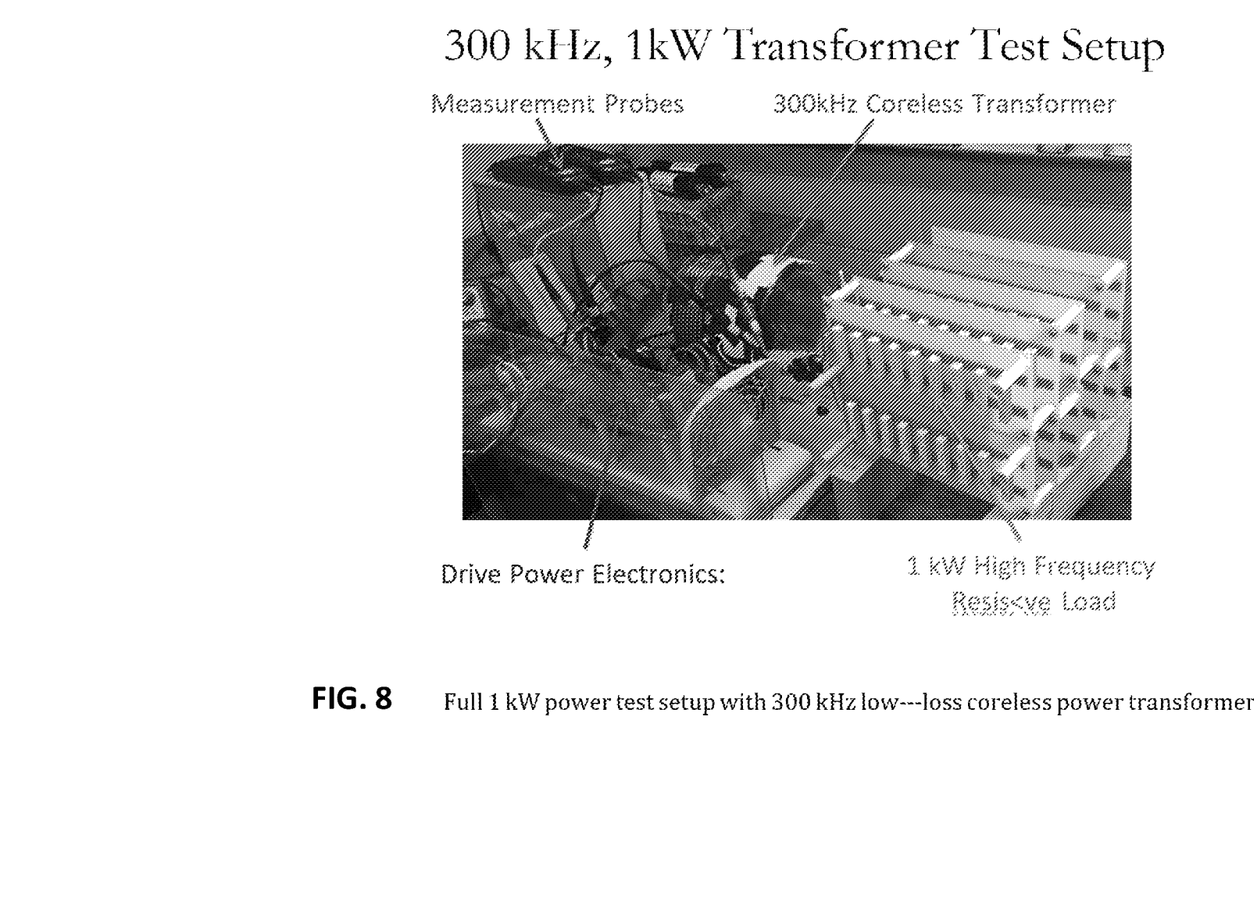
FIG. 8 depicts full 1 kW power test setup with 300 kHz low-loss coreless power transformer.

The setup for the 300 kHz low-loss coreless power transformer full 1 kW power testing is shown in FIG. 8. This picture shows the Drive Power Electronics, the Measurement Probes, the 1 kW High Frequency Resistive Load, and the 300 kHz Coreless Transformer. Not depicted in the picture are standard off-the-shelf power sources used to supply the DC power for the Power Electronic Drive.

CONCLUSION

A system and method has been shown in the above embodiments for the effective implementation of an improved design for a coreless transformer. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by size, materials, or specific manufacturing techniques.

The invention claimed is:

1. A transformer system comprising:
four magnetically coupled coils that have fixed spacing geometry comprising:
a drive coil (21) that produces magnetic fields;
a load coil (24);
a first resonant coil (22);
a second resonant coil (23);
the following six magnetic couplings exist between the four magnetically coupled coils: a first magnetic coupling between the drive coil (21) and the first resonant coil (22), a second magnetic coupling between the first resonant coil (22) and the second resonant coil (23), a third magnetic coupling between the second resonant coil (23) and the load coil (24), a fourth magnetic coupling between the drive coil (21) and the second resonant coil (23), a fifth magnetic coupling between the first resonant coil (22) and the load coil (24), and a sixth magnetic coupling between the drive coil (21) and the load coil (24),
the drive coil (21) producing magnetic fields and the first resonant coil (22) being magnetically coupled to the drive coil (21) producing energy that is stored by the first resonant coil (22) and the second resonant coil (23) being magnetically coupled to the first resonant coil (22) to propagate the energy stored in the first resonant coil (22) to the second resonant coil (23) without using a magnetic core, wherein the second resonant coil (23) is then magnetically coupled to the load coil (24) where the energy is transferred to the load coil (24), and
wherein the first resonant coil (22) and the second resonant coil (23) are different in at least one of, or a combination of, the following: (a) the first resonant coil (22) and the second resonant coil (23) have different number of turns, (b) the first resonant coil (22) and the second resonant coil (23) have different turn spacing, and (c) the first resonant coil (22) and the second resonant coil (23) have different wire sizes.

2. The transformer system of claim 1, wherein each of the difference in (a), (b), or (c) are less than 2-fold.

3. The transformer system of claim 1, wherein the first resonant coil (22) has N2 turns and the second resonant coil (23) has N3 turns, wherein N3>N2.

4. The transformer system of claim 1, wherein the first resonant coil (22) has N2 turns and the second resonant coil (23) has N3 turns, wherein N2 is picked to be in the following range: 6≤N2<9 and N3 is picked to be in the following range: 7<N3≤12.

5. The transformer system of claim 1, wherein difference in the different turn spacing between the first resonant coil (22) and the second resonant coil (23) is at least 5%.

6. The transformer system of claim 1, wherein the transformer system operates at an operating frequency picked in the following range: 100 kHz-300 kHz.

7. The transformer system of claim 1, wherein the first resonant coil (22) and drive coil (21) are inductively coupled.

8. The transformer system of claim 1, wherein the second resonant coil (23) and load coil (24) are inductively coupled.

9. The transformer system of claim 1, wherein the drive coil (21), the first resonant coil (22), the second resonant coil (23), and the load coil (24) each have a lumped circuit representation by L, C and R circuit elements and their mutual magnetic couplings.

10. The transformer system of claim 1, wherein the magnetic coupling between the four magnetically coupled coils is employed to determine the transformer system's performance.

11. A transformer system comprising:
four magnetically coupled coils that have fixed spacing geometry comprising:
a drive coil (21) that produces magnetic fields;
a load coil (24);
a first resonant coil (22);
a second resonant coil (23);
the following six magnetic couplings exist between the four magnetically coupled coils: a first magnetic coupling between the drive coil (21) and the first resonant coil (22), a second magnetic coupling between the first resonant coil (22) and the second resonant coil (23), a third magnetic coupling between the second resonant coil (23) and the load coil (24), a fourth magnetic coupling between the drive coil (21) and the second resonant coil (23), a fifth magnetic coupling between the first resonant coil (22) and the load coil (24), and a sixth magnetic coupling between the drive coil (21) and the load coil (24),
the drive coil (21) producing magnetic fields and the first resonant coil (22) being magnetically coupled to the drive coil (21) producing energy that is stored by the first resonant coil (22) and the second resonant coil (23) being magnetically coupled to the first resonant coil (22) to propagate the energy stored in the first resonant coil (22) to the second resonant coil (23) without using a magnetic core, wherein the second resonant coil (23) is then magnetically coupled to the load coil (24) where the energy is transferred to the load coil (24), and
wherein capacitance values of two parallel capacitors used to resonate the first resonant coil (22) and the second resonant coil (23) are different.

12. The transformer system of claim 11, wherein difference in capacitance values is less than 3-fold.

13. The transformer system of claim 12, wherein difference in capacitance values is between 1-fold to about 2 ½-fold.

14. The transformer system of claim 11, wherein the transformer system operates at an operating frequency picked in the following range: 100 kHz-300 kHz.

15. The transformer system of claim 11, wherein the first resonant coil (22) and drive coil (21) are inductively coupled.

16. The transformer system of claim 11, wherein the second resonant coil (23) and load coil (24) are inductively coupled.

17. The transformer system of claim 11, wherein the drive coil (21), the first resonant coil (22), the second resonant coil (23), and the load coil (24) each have a lumped circuit representation by L, C and R circuit elements and their mutual magnetic couplings.

18. The transformer system of claim 11, wherein the magnetic coupling between the four magnetically coupled coils is employed to determine the transformer system's performance.

19. A method of implementing energy transfer with four magnetically coupled coils comprising:
producing magnetic fields using a drive coil (21);
providing a magnetically coupled load coil (24);
magnetically coupling the drive coil (21) and a first resonant coil (22);
magnetically coupling the first resonant coil (22) and a second resonant coil (23);
magnetically coupling the second resonant coil (23) and the load coil (24);
magnetically coupling the drive coil (21) and the second resonant coil (23);
magnetically coupling the first resonant coil (22) and the load coil (24);
magnetically coupling the drive coil (21) and the load coil (24); and
picking the first resonant coil (22) and the second resonant coil (23) to be different in at least one of, or a combination of, the following manner: (a) the first resonant coil (22) and the second resonant coil (23) have different number of turns, (b) the first resonant coil (22) and the second resonant coil (23) have different turn spacing, and (c) the first resonant coil (22) and the second resonant coil (23) have different wire sizes, or (d) capacitance values of two parallel capacitors used to resonate either the first resonant coil (22) or the second resonant coil (23) are different, and
wherein each of the difference in (a), (b), (c), or (d) are less than 2-fold.

20. The method of claim 19, wherein the first resonant coil (22) has N2 turns and the second resonant coil (23) has N3 turns, wherein N3>N2.

21. The method of claim 19, wherein the first resonant coil (22) has N2 turns and the second resonant coil (23) has N3 turns, wherein N2 is picked to be in the following range: 6≤N2≤9 and N3 is picked to be in the following range: 7<N3≤12.

22. The method of claim 19, wherein difference in the different turn spacing between the first resonant coil (22) and the second resonant coil (23) is at least 5%.

23. The method of claim 19, wherein the transformer system operates at an operating frequency picked in the following range: 100 kHz-300 kHz.

24. The method of claim 19, wherein the first resonant coil (22) and drive coil (21) are inductively coupled.

25. The method of claim 19, wherein the second resonant coil (23) and load coil (24) are inductively coupled.

26. The method of claim 19, wherein the drive coil (21), the first resonant coil (22), the second resonant coil (23), and the load coil (24) each have a lumped circuit representation by L, C and R circuit elements and their mutual magnetic couplings.

27. The method of claim 19, wherein the magnetic coupling between the four magnetically coupled coils is employed to determine the transformer system's performance.

\* \* \* \* \*